(12) United States Patent
Edholm

(10) Patent No.: US 6,532,893 B1
(45) Date of Patent: Mar. 18, 2003

(54) DEVICE ARRANGED TO CARRY A SET OF TEATCUPS

(75) Inventor: Gustav Edholm, Mariefred (SE)

(73) Assignee: Delaval Holding AB, Tumba (SE)

( * ) Notice: Subject to any disclaimer, the term of this patent is extended or adjusted under 35 U.S.C. 154(b) by 0 days.

(21) Appl. No.: 09/744,098

(22) PCT Filed: Jul. 16, 1999

(86) PCT No.: PCT/SE99/01240
§ 371 (c)(1),
(2), (4) Date: Jan. 16, 2001

(87) PCT Pub. No.: WO00/03585
PCT Pub. Date: Jan. 27, 2000

(30) Foreign Application Priority Data

Jul. 16, 1998 (SE) .................................. 9802557

(51) Int. Cl.$^7$ .................................................. A01J 5/04
(52) U.S. Cl. .................................................. 119/14.47
(58) Field of Search .................... 119/14.01, 14.02, 119/14.05, 14.08, 14.19, 14.47–14.53

(56) References Cited

U.S. PATENT DOCUMENTS

| | | | |
|---|---|---|---|
| 3,234,906 A | * | 2/1966 | Jensen ..................... 119/14.02 |
| 3,482,547 A | * | 12/1969 | Maier |
| 3,556,053 A | * | 1/1971 | Padman et al. .......... 119/14.08 |
| 3,726,253 A | * | 4/1973 | Duncan ................... 119/14.18 |
| 3,861,355 A | * | 1/1975 | Johnson et al. .......... 119/14.08 |
| 3,938,470 A | * | 2/1976 | Pace ........................ 119/14.08 |
| 4,344,385 A | | 8/1982 | Swanson et al. ......... 119/14.08 |
| 4,508,058 A | * | 4/1985 | Jakobson et al. ........ 119/14.02 |
| 6,289,845 B1 | * | 9/2001 | Andersson ............... 119/14.08 |

FOREIGN PATENT DOCUMENTS

| | | | |
|---|---|---|---|
| EP | 0091892 | 10/1983 | ......... A01K/12/00 |
| EP | 0205431 | 5/1989 | ............ A01J/7/00 |
| EP | 0560438 | 9/1993 | ........... A01K/1/12 |
| EP | 0565189 | 10/1993 | ............ A01J/7/00 |
| WO | WO8503410 | 8/1985 | ............ A01J/7/00 |

* cited by examiner

Primary Examiner—Charles T. Jordan
Assistant Examiner—Kimberly S. Smith
(74) Attorney, Agent, or Firm—Hovey Williams LLP

(57) ABSTRACT

The invention refers to a device which is arranged to carry a set of teatcups arranged to be attached to a respective teat. The device includes a carrying member, which is displaceable between at least a first inactive position beside the animal to be milked and a second active milking position and on which the teatcups are mounted via a respective flexible conduit member. The conduit member includes at least a milk conduit and is designed to permit a certain movability of the teatcup in relation to the carrying member. Each conduit member extends upwardly from the carrying member and connects to a side portion of the respective teatcup.

17 Claims, 2 Drawing Sheets

DEVICE ARRANGED TO CARRY A SET OF TEATCUPS

THE BACKGROUND OF THE INVENTION AND PRIOR ART

The present invention refers to a device arranged to carry a set of teatcups arranged to be attached to a respective teat, wherein the device includes a carrying member, which is displaceable between at least a first inactive position beside the animal to be milked and a second active milking position and on which the teatcups are mounted via a respective flexible conduit member, including at least a milk conduit and designed to permit a certain movability of the teatcup in relation to the carrying member.

Today, it is usual to utilise a so-called claw for milking of cows. The claw is connected to the teatcups via a respective short milk conduit and arranged to collect the milk from the different teats and convey it in a common long milk conduit to a milk collecting member. However, with the present design the claw is relatively heavy to handle for the milkers. In addition, there is a risk that the teatcups contact the ground when the milking has been terminated and the teatcups are pulled off from the teats.

Work is also done today regarding different solutions without a teatcup claw, so called quarter milking, i.e. the milk from the different teats are not collected and conveyed commonly to the milking machine but is conveyed in separate conduits for each teat to the milking machine. Thereby, it is possible to reduce the risk of infections and in particular the risk that an infected udder part will infect a healthy udder part via the short milk conduits and the claw. Moreover, quarter milking has the advantage that the milking may be adapted to each individual udder part in such a manner that the milking is correctly terminated, i.e. when the udder part in question is properly emptied. In connection with quarter milking, it is however usual to connect each teatcup to the milking machine by a separate milk hose. Thereby, the risk is significant that the teatcups, after the milking is terminated, reach the floor and in addition it is difficult to arrange a convenient and simple handling of the teatcups.

U.S. Pat. No. 4,344,385 discloses a device of the initially mentioned type having a support arm which is connected to a carrying plate on which the teatcups are fixedly mounted via a flexible short milk conduit designed to permit a certain movability of the teatcups in relation to the carrying plate. This document discloses different embodiments which are adapted to so called quarter milking.

EP-B-205 431 discloses a milking device having a sort of claw and four teatcups. Between the claw and the teatcups, a milk conduit extends, which connects to a side portion of the respective teatcup.

SUMMARY OF THE INVENTION

The object of the present invention is to provide a device by which the problems mentioned above may be remedied. In particular, it is aimed at a device carrying the teatcups in such a manner that these may be applied to the teats of an animal in an easy way. In addition, it is aimed at a device by which one may guarantee that the teatcups may not contact the ground after the milking is terminated.

This object is obtained by the device initially defined, which is characterized in that each conduit member extends upwardly from the carrying member and connects to a side portion of the respective teatcup. By such a design of the conduit member, it is possible to provide the teatcups on the carrying member in such a manner that they are easily engagable by the person to apply the teatcups to the teats of the animal to be milked. By the design according to the invention, the teatcups are also easily gripped by means of a robot arm in connection with automatic application of the teatcups to the teats of the animal to be milked. In addition, by the design according to the invention it is possible to avoid that the teatcups contact the ground after the milking is terminated when they are released or pulled off from their respective teat. By the geometric extension of the conduit members and by the fact that the conduit members merely permit a certain movability of the teatcup in relation to the carrying member and thus have a certain rigidity, which merely permits a limited displacement of the teatcups from the position they take when the teatcups are applied to their respective teat, it is possible to define in advance a desired position for teatcups in relation to the carrying member when the teatcups are not applied to a teat. Furthermore, by the design according to the invention it is possible to let the teatcups influence the teats merely by a pulling force.

According to an embodiment of the invention, each conduit member includes a first portion extending substantially vertically upwardly from the carrying member at least when the carrying member is in the second active milking position and the teatcup in question is attached to a teat The flexible conduit member will thereby permit a certain bending of the first portion, which means that the teatcup is moved downwardly. Furthermore, each conduit member may include a second portion extending substantially horizontally to a respective teatcup at least when the carrying member is in the second active milking position and the teatcup in question is attached to a teat. Advantageously, each conduit member includes a connecting portion connecting the first portion and the second portion and including a bending. This bending may be substantially perpendicular and advantageously the connecting portion is manufactured in a substantially rigid material. In such a manner the conduit member is given a predetermined shape when i t is not loaded. Thereby, the first portion and the second portion are advantageously manufactured in a flexible material. In such a manner the movability of the conduit member may be controllable, The first and the second portions may be bent but not perform any other significant movement. By bending the first portion the teatcup will thus be displaceable in a substantially horizontal plane. By also permitting the second portion to be bent the teatcup may be displaced downwardly. Advantageously, the second portion, in the proximity of its respective teatcup, extends substantially radially outwardly with regard to a longitudinal axis of the teatcup.

According to a further embodiment of the invention, each conduit member is connected to a milking machine via a respective separate long milk conduit. Consequently, the device according to the invention is appropriate for so called quarter milking and by means of the carrying member proposed, the individual teatcups may be kept together and easily engagable to a user.

According to a further embodiment of the invention, the carrying member is connected to an arm which is rotatable about an axis being substantially perpendicular to the arm. By such an arm, the carrying member may in a simple manner be displaced between the first position and the second position mentioned above. Advantageously, the carrying member is rotatable in relation to the arm about a substantially vertical axis. In such a manner, it is possible to position the carrying member, and thus the teatcups, in substantially the same position in relation to the teats irrespective of the rotary position of the arm. Thereby, the carrying member may be connected to the arm via a support extending laterally from the arm and including a rotatable connection to the carrying member. Furthermore, the arm may advantageously be adjustable with regard to its longitudinal direction. In such a manner, the possibilities to position the carrying member, and thus the teatcups, properly in relation to the teats of the animal to be milked are further increased Thereby, the arm may be telescopic. Furthermore, the arm is advantageously displaceable in a substantially vertical direction, which also increases the adjustment possibilities of the teatcups and may, for instance, be of great value in connection with cleaning of the teatcups after the performance of the milking. Thereby, the arm may be rotatably connected to a bar which is displaceably arranged in a frame member. Such a frame member may be substantially stationary in the milking stall and thus offer a satisfactory support for the arm, the carrying member and the teatcups.

BRIEF DESCRIPTION OF THE DRAWINGS

The present invention is now to be explained more closely by a description of an embodiment thereof and with reference to the drawings attached, in which FIG. 1 discloses a perspective view of a device according to the invention, FIG. 2 discloses a perspective view of a teatcup and an associated conduit member of the device in FIG. 1.

DESCRIPTION OF AN EMBODIMENT OF THE INVENTION

Figure 1:
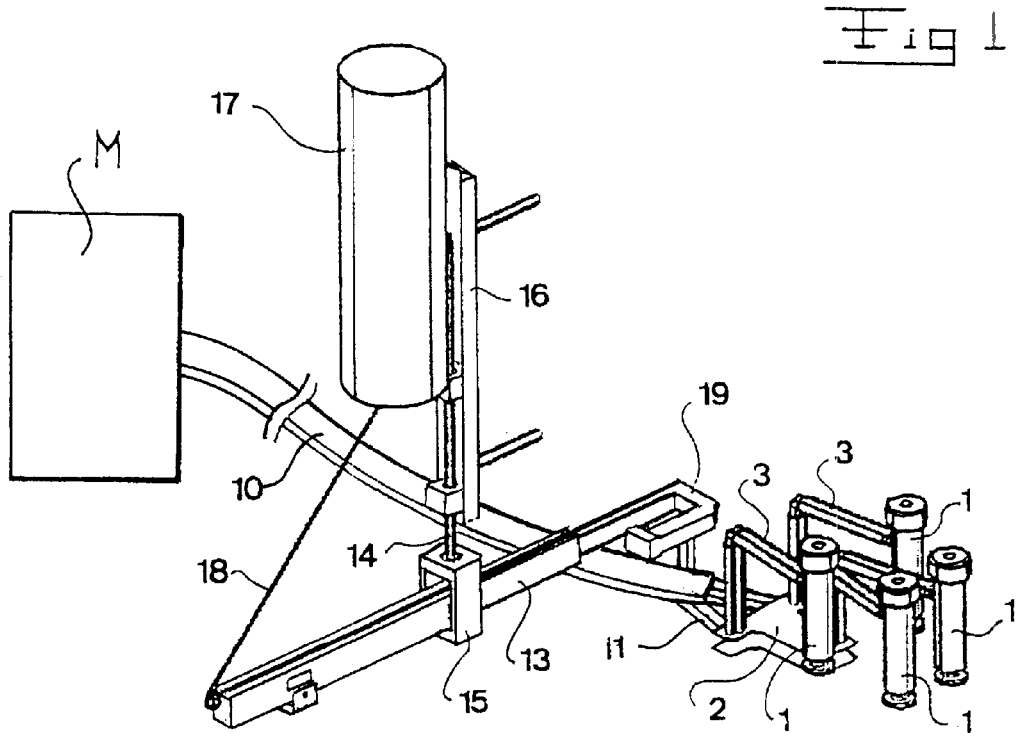

FIG. 1 discloses a device which is arranged to carry a set of teatcups 1, and in particular four teatcups 1. The device is in a first instance described with respect to milking of cows or buffaloes having four teatcups 1 but it is also applicable to milking of other animals, such as horses, goats, sheep, where normally only two teatcups are utilized. Each teatcup 1 is fixedly mounted to a carrying member 2 via a conduit member 3. Each conduit member 3, see FIG. 2, includes a short milk conduit 3' and a short pulse conduit 3". The conduit member 3 connects to a side portion of the teatcup 1, i.e. the conduit member 3 extends through the sidewall or shell of the teatcup 1. In the example disclosed, the conduits 3' and 3" connect to respective pipe nipples 1' and 1" extending outwardly from the side portion or shell of the teatcup 1. The conduit member 3 connects to the teatcup 1 at a relatively high level, preferably at the upper half of the teatcup.

Figure 2:
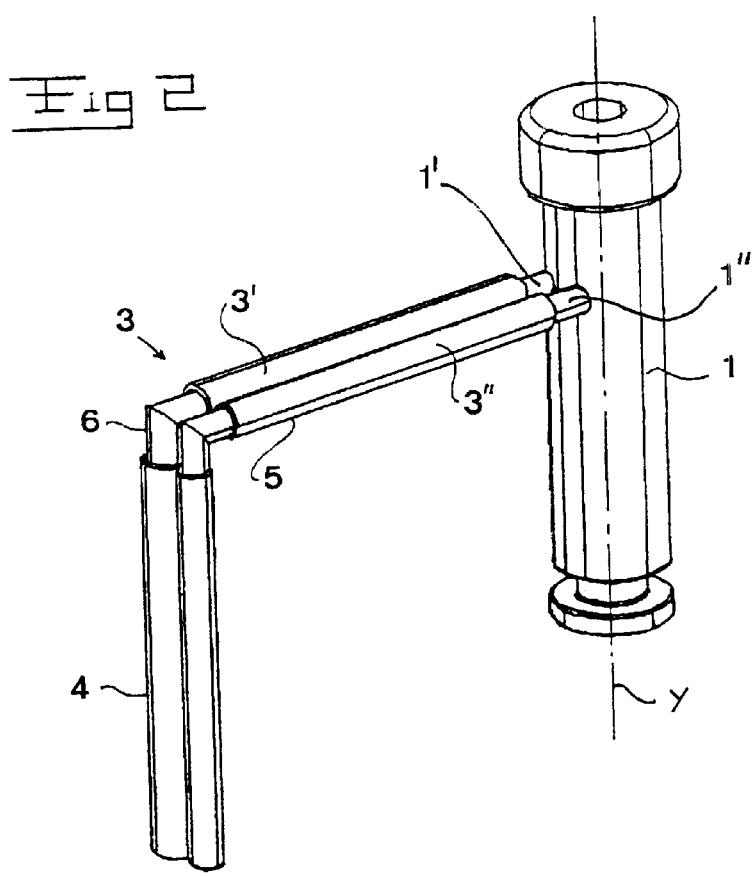

Furthermore, each conduit member 3 includes, as appears from FIG. 2, a first portion 4 extending substantially vertically upwardly from the carrying member 2 at least when the carrying member 2 is in an active milking position and the teatcup 1 is attached to a teat. Furthermore, each conduit member 3 includes a second portion 5 extending substantially horizontally to the teatcup at least when the device is in the active milking position and the teatcup is attached to a teat. Consequently, in this position the second portion 5 extends substantially radially outwardly from a longitudinal axis y of the teatcup 1. The first portion 4 and the second portion 5 are connected to each other via a connecting portion 6 comprising a bending which is substantially perpendicular. The connecting portion 6 is manufactured in a substantially rigid material preferably plastic, whereas the first portion 4 and the second portion 5 both are manufactured in a flexible, i.e. bendable, material. Consequently, the first and the second portions 4, 5 may include, for instance, a rubber hose having a certain flexibility. Due to this flexibility, the teatcups, when they are located in an inactive position, i.e. are not applied to a teat, will thus be displaced downwardly from the position disclosed in FIG. 3, as shown in FIG. 4. However, it is to be noted that the portions 4, 5 have a certain rigidity or stiffness so that the teatcups 1 only may be displaced downwardly a relatively short distance. When the portions 4, 5 are not subjected to external forces, i.e. in a rest position or normal position, they will be located in the position disclosed in FIG. 2. Due to the weight of the teatcups 1, the conduit members 3 will however be bent downwardly when the teatcups I are not attached to a teat. For instance, the teatcups 1, when they are not applied to a teat, may be displaced so far downwardly that an upper end of the teatcup is located at the level of the carrying member 2. In such a manner it is ensured that the teatcups 1 always are easily engagable by a user or by means of a robot arm, and that the teatcups 1 may not contact the ground when they are not applied to a teat.

Figure 3:
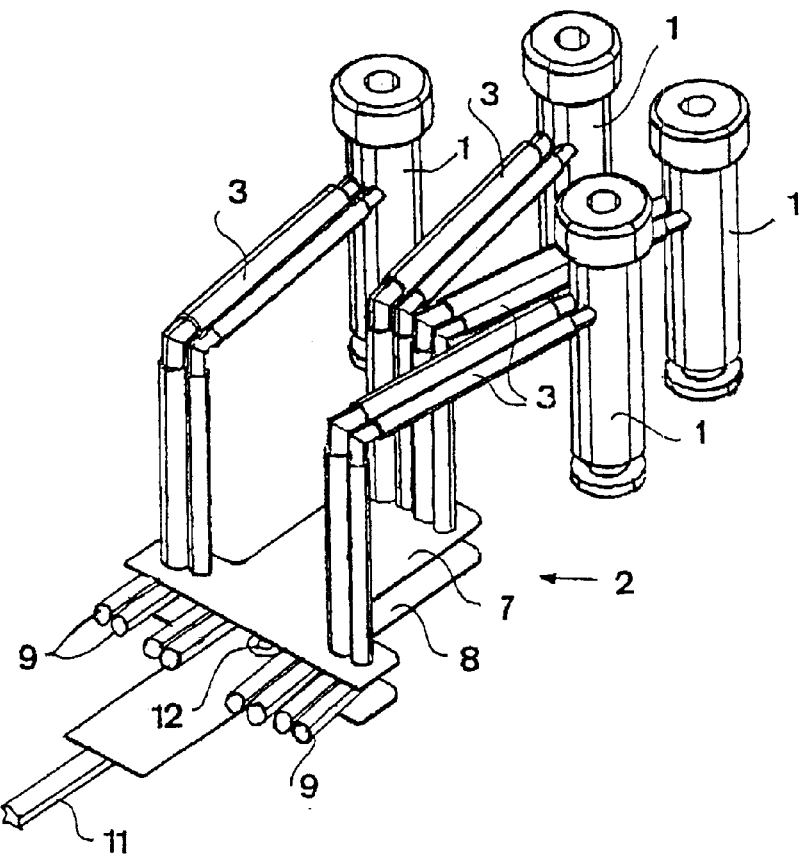
FIG. 3 discloses a perspective view of a carrying member of the device in FIG. 1.
Figure 4:
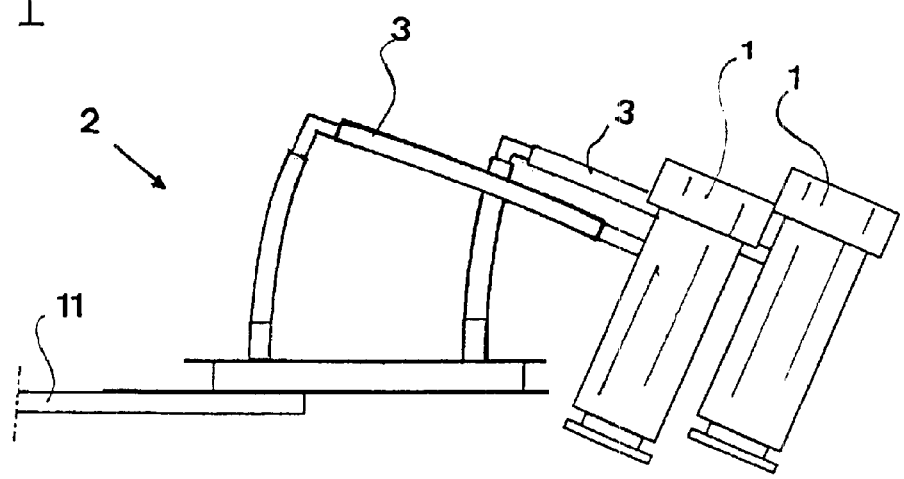
FIG. 4 discloses an elevational view of the carrying member of the device in an inactive position vertically displaced downwardly with respect to the position shown in FIG. 3.

FIG. 3 discloses more closely an example of how the carrying member 2 may be designed. The carrying member 2 includes, in the example disclosed, an upper plate 7 and a lower plate 8. The upper plate 7 has, seen from above, the shape of a T, from which the conduit members 3 extend essentially vertically. The conduit members 3 are arranged on the carrying member 2 in such a manner that the position of the teatcups I corresponds essentially to the position of the teats on the udder of an animal. Thereby, the conduit members are fixedly connected to the carrying member 2 and extend through the holes in the upper plate 7. In the example disclosed, each conduit 3', 3" is connected to a pipe 9 comprising a substantially perpendicular bending an being provided between the upper plate 7 and the lower plate 8. The second end of such pipe 9 is connected to a long milk conduit or to a long pulse conduit. The long pulse conduits or the long milk conduits form together a conduit bundle 10 extending to a schematically indicated milking machine M, see FIG. 1. The pipe 9 is manufactured in a rigid material, preferably plastic, and is clamped between the upper plate 7 and the lower plate 8 in such a manner that the position of the conduit members 3 is fixed in relation to the carrying member 2. The pipes 9 may extend through the upper plate 7 and into the respective conduits 3', 3".

The lower plate 8 is rotatably connected to a support 11 via a rotary connection 12, which is indicated in FIG. 3. The carrying member 2 may thus rotate in a horizontal plane in relation to the support 11. Consequently, the support 11 extends away from the plate and is in its second end fixedly connected to an arm 13, see FIG. 1.

The arm 13 is telescopic and comprises three sections which are insertable in each other in such a manner that the length of the arm 13 may be adjusted. The arm 13 is connected to a substantially vertical bar. 14 via a rotary connection 15, i.e. the arm 13 may rotate in a substantially horizontal plane in relation to the bar 14, The bar 34 is displaceably provided in a frame member 16 and may thus, by means of a pneumatic cylinder (not disclosed), be displaced upwardly and downwardly, respectively, i.e. the arm 13 and the carrying member 2 may be raised and lowered, respectively. The bar 14 may also be displaceable in relation to the frame member by means of a balancing member in such a manner that the arm 13 and the carrying member 2 may be raised and lowered, respectively, manually by applying a relatively small force. The rotary connection 15 comprises a holder in which the thickest section of the arm 13 is fixedly arranged. Furthermore, a so-called removal member 17 is provided on the frame member 16. The removal member comprises a cord 18 extending through the arm 13 and being fixedly connected to the thinnest section of the arm 13. When the removal member 17 pulls the cord 18, the thinnest section will thus be pulled into the intermediate section which is pulled into the thickest section. When the removal member 17 is deactivated the arm 13 may simply be pulled out again. Possibly, the arm 13 may comprise a spring or any similar member displacing the arm to an extended position and thereby, the removal member 17 compresses the arm 13 against the action of the spring force.

Furthermore, the arm 13 comprises, in the example disclosed, a handle 19 facilitating the manual operation of the device. Consequently, the carrying member 2 and thus the teatcups 1 may by the device disclosed in an easy manner be brought to a position where the teatcups 1 are located essentially straight below the teats of the animal to be milked. Thereafter, the teatcups 1 may in a very easy manner be lifted upwardly and thereby be applied to the respective teat. Thanks to the great movability of the device, the teatcups 1 and the carrying member 2 will in addition be able to follow possible movements of the teats during the milking if the animal is moving in the milking stall. In such a manner, it is ensured that the teatcups 1 always may hang essentially straight downwardly from the udder and do not exert any negative forces to the teats but substantially only a certain downwardly directed pulling force.

The invention is not limited to the embodiment disclosed but may be varied and modified in many different manners within the scope of the following claims. For instance, it is to be noted that the carrying member 2 may be designed in various ways. It is essential that the carrying member 2 permits the arrangement of the conduit member 3 in such a manner that they extend upwardly from the carrying member 2. Within the scope of the invention it is also possible to replace the carrying member 2 by a teatcup claw for collecting the milk from the different teatcups 1.

What is claimed is:

1. A device arranged to carry a set of teatcups arranged to be attached to a respective teat of an animal to be milked, each of the teatcups having a bottom, a side wall and a top, said device comprising:
    a plurality of flexible conduit members; and
    a carrying member which is displaceable between at least a first inactive position beside the animal to be milked and a second active milking position and on which the teatcups are mounted via a respective one of said flexible conduit members each including at least a milk conduit and designed to permit a certain movability of the teatcup in relation to the carrying member, wherein each of said conduit members extends upwardly from the carrying member and connects to the side wall of the respective teatcup, wherein each of said conduit members includes a first portion extending substantially vertically upwardly from the carrying member at least when the carrying member is in the second active milking position, and wherein each of said conduit members further includes a second portion extending essentially horizontally to a respective teatcup at least when the carrying member is in the second active milking position and the teatcup in question is attached to a teat and wherein the second portion connects to the teat cup at an upper half of the teat cup and wherein the teatcup is orientated upwardly when the carrying member is in the inactive position.

2. A device according to claim 1, wherein each conduit member includes a connecting portion connecting the first portion and the second portion and including a bending.

3. A device according to claim 2, wherein said bending is substantially perpendicular.

4. A device according to claim 2, wherein the connecting portion is manufactured in a substantially rigid material.

5. A device according to claim 2, wherein the first portion and the second portion are manufactured in a flexible material.

6. A device according to claim 5, wherein the second portion, in the proximity of its respective teatcup, extends substantially radially outwardly with respect to a longitudinal axis of the teatcup.

7. A device according to claim 1, wherein the second portion in the proximity of its respective teatcup extends substantially radially outwardly with respect to a longitudinal axis of the teatcup.

8. A device according to claim 1, wherein each conduit member is connected to a milking machine via a respective separate long milk conduit.

9. A device according to claim 1, wherein the carrying member is connected to an arm which is rotatable about an axis being substantially perpendicular to the arm.

10. A device according to claim 9, wherein the carrying member is rotatable in relation to the arm about a substantially vertical axis.

11. A device according to claim 9, wherein the carrying member is connected to the arm via a support extending laterally from the arm and including a rotary connection to the carrying member.

12. A device according to claim 11, wherein the arm is adjustable with regard to its longitudinal direction.

13. A device according to claim 9, wherein the arm is adjustable with regard to its longitudinal direction.

14. A device according to claim 13, wherein the arm is telescopic.

15. A device according to claim 14, wherein the arm is displaceable in a substantially vertical direction.

16. A device according to claim 9, wherein the arm is rotatably connected to a bar which is displaceably arranged in a frame member.

17. A device according to claim 9, wherein the arm is displaceable in a substantially vertical direction.

\* \* \* \* \*